United States Patent
Gorman et al.

(10) Patent No.: US 11,260,709 B2
(45) Date of Patent: Mar. 1, 2022

(54) INSIDE FRAME RAIL IMPACT RELEASE MOUNTED TOW HOOK WITH AND AUTOMOTIVE VEHICLE WITH IMPACT RELEASE MOUNTED TOW HOOKS

(71) Applicants: Matthew Gorman, Livonia, MI (US); Charles R Buttler, Grand Blanc, MI (US); Jagan M Mummadi, Novi, MI (US); Eric A Darin, Royal Oak, MI (US)

(72) Inventors: Matthew Gorman, Livonia, MI (US); Charles R Buttler, Grand Blanc, MI (US); Jagan M Mummadi, Novi, MI (US); Eric A Darin, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 321 days.

(21) Appl. No.: 16/387,691

(22) Filed: Apr. 18, 2019

(65) Prior Publication Data

US 2020/0331312 A1   Oct. 22, 2020

(51) Int. Cl.
*B60D 1/48*      (2006.01)
*B60D 1/04*      (2006.01)
*B60D 1/24*      (2006.01)
*B62D 21/02*    (2006.01)

(52) U.S. Cl.
CPC .............. *B60D 1/488* (2013.01); *B60D 1/04* (2013.01); *B60D 1/244* (2013.01); *B62D 21/02* (2013.01)

(58) Field of Classification Search
CPC .......... B60D 1/488; B60D 1/04; B60D 1/244; B62D 21/02
See application file for complete search history.

(56) References Cited

U.S. PATENT DOCUMENTS

| | | | | |
|---|---|---|---|---|
| 6,802,522 B1* | 10/2004 | Park | ...................... | B60D 1/243 280/495 |
| 7,472,919 B2* | 1/2009 | Pratt | ...................... | B60D 1/485 280/402 |
| 7,775,546 B2* | 8/2010 | Asjad | ...................... | B60D 1/54 280/498 |
| 8,246,069 B2* | 8/2012 | Ladzinski | ................ | B60D 1/56 280/495 |
| 8,419,040 B2* | 4/2013 | Ando | ...................... | B60D 1/04 280/495 |
| 8,678,423 B1* | 3/2014 | Hwang | ................... | B60R 19/34 280/495 |
| 10,214,243 B2* | 2/2019 | Elbkaily | ................ | B62D 21/02 |
| 2018/0257445 A1* | 9/2018 | Degenkolb | ............. | B60D 1/54 |
| 2019/0030970 A1* | 1/2019 | Setru | ...................... | B60D 1/565 |

* cited by examiner

*Primary Examiner* — Minnah L Seoh
*Assistant Examiner* — Michael R Stabley
(74) *Attorney, Agent, or Firm* — Ralph E. Smith

(57) ABSTRACT

A tow hook has a front portion extending forwardly from a front side of a side frame rail of an automotive vehicle and a rear portion received in a channel of the frame rail. The tow hook is releasably mounted to the side frame rail so that it releases at low impact force. The rear portion of each tow hook has at least one open slotted mounting member having a slot therein that extends rearwardly from an open front end of the slot. Each open slotted mounting member of the rear portion of each tow hook is secured to a wall of the side frame rail to which it is mounted. A vehicle has the tow hook mounted to a left side frame rail and another such tow hook mounted to a right side frame rail.

15 Claims, 3 Drawing Sheets

INSIDE FRAME RAIL IMPACT RELEASE MOUNTED TOW HOOK WITH AND AUTOMOTIVE VEHICLE WITH IMPACT RELEASE MOUNTED TOW HOOKS

FIELD

The present invention relates to tow hooks and an automotive vehicle having the tow hooks mounted to frame rails.

BACKGROUND

Automotive vehicles having a frame, pickup trucks in particular, are often equipped with front tow hooks. A towline is securable to the tow hooks and to an item to be towed and the vehicle driven in reverse to pull the item to be towed. The tow hook is typically mounted to the frame of the vehicle, such as to fronts of side rails of the frame, and at least a front portion of the tow hook extends forwardly from the frame. The front portion has a tow opening to which a towline can be secured, such as an eyelet. The tow opening may for example have an eyelet configuration and the tow line passed through the eyelet and secured, or an end hook to which the tow line is attached received in the tow opening. It should be understood that the tow opening can have various other configurations. For example, the tow opening could have a hook shape.

The side frame rails are typically channel rails. In some cases, the channel rail has an open cross-section such as a C cross-section, and in some cases having a closed cross-section, such as a rectangular cross-section. In the latter case, the channel rail in some cases is made of a rectangular tube or in some cases by welding two right-angle sections together. Regardless, the channel rail has a longitudinally extending channel therein.

To avoid damaging the front end of the vehicle, such as the bumper assembly and/or frame, there are tow hooks that are mounted to the vehicle in a manner that they break away in one fashion another when the vehicle is involved in a front-end impact, typically at a low speed such as around 4 miles per hour. Also, by having the tow hooks break away when a low speed front end impact occurs, they are agnostic to the impact management of the front end, which includes for example, at what degree of force results in impact sensors triggering the air bags to go off. This allows the same tow hook to be used on vehicles having different front-end configurations without needing to account for the tow hook in designing the impact management of each front-end configuration. It also obviates the need to change the design of the impact management of the front end of vehicle depending on whether the vehicle is to be equipped with the tow hook or not.

One type of front tow hook that breaks away when a vehicle experiences a low front-end impact is the front tow hook available on the RAM® 1500 pickup truck available from FCA US LLC. This front tow hook has a rear portion mounted on an underside of a side frame rail and spins outboard in the event of a low front-end impact.

SUMMARY

In accordance with an aspect of the present disclosure, an automotive vehicle has a frame. The frame has frame rails including a longitudinally extending left side frame rail and a longitudinally extending right side frame rail. Each of the left side frame rail and the right side frame rail has an interior channel. A tow hook is releasably mounted to the left side frame rail and has a front portion extending forwardly from a front side of the left side frame rail and a rear portion received in the channel of the left side frame rail. Another tow hook is releasably mounted to the right side frame rail and has a front portion extending forwardly from a front side of the right side frame rail and a rear portion received in the channel of the right side frame rail. The rear portion of each tow hook has at least one open slotted mounting member having a slot therein that extends rearwardly from an open front end of the slot. Each open slotted mounting member of the rear portion of each tow hook is secured to a wall of the side frame rail to which it is mounted by a fastener that extends through the slot and tightened to that open slotted mounting member at a torque that allows the rear portion to release from the side frame rail to which it is mounted when the tow hook is impacted at a low impact force.

In an aspect, the rear portion of each tow hook has more than one said open slotted mounting member with one open slotted mounting member a front mounting member and another open slotted mounting member a rear mounting member wherein the front and rear open slotted mounting members are longitudinally spaced from each other.

In an aspect the fastener includes a nut and a bolt with the bolt extending through the wall of the side frame rail and the slot of the open slotted mounting member and the nut tightened on the bolt.

In an aspect, the rear open slotted mounting member has an angled front wall at a front of the slot of the rear open slotted mounting member wherein the angled front wall angles upwardly and backwardly from a lower rear of the front open slotted mounting member at an angle between horizontal and vertical. In an aspect, the angle at which the angled front wall angles upwardly and backwardly is forty-five degrees.

In an aspect, the front portion of each tow hook has a tow opening.

BRIEF DESCRIPTION OF THE DRAWINGS

The present invention will become more fully understood from the detailed description and the accompanying drawings, wherein.

DETAILED DESCRIPTION

Figure 1:
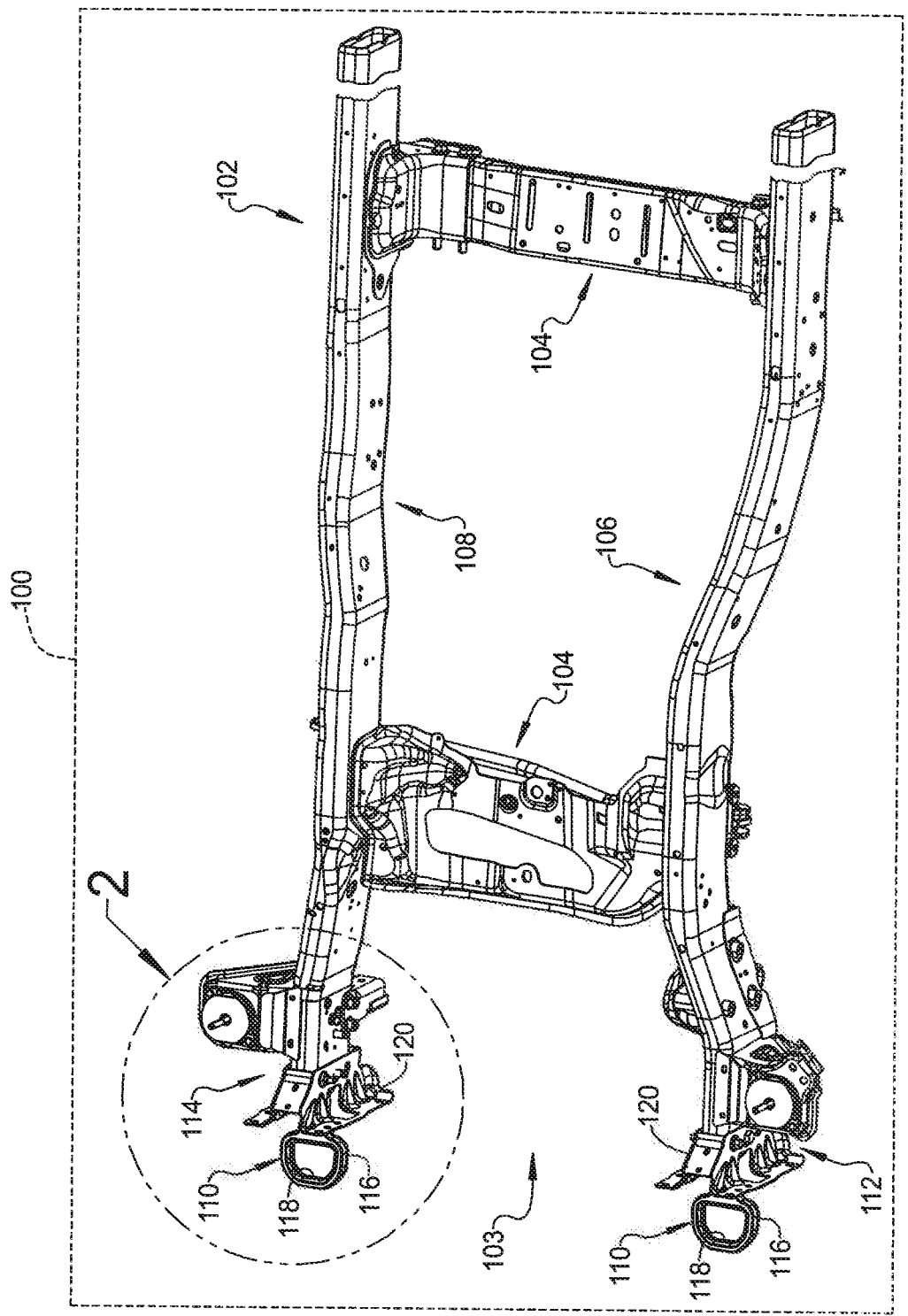
FIG. 1 is a perspective view of a frame of an automotive vehicle having tow hooks extending forwardly from fronts of side frame rails of the frame in accordance with an aspect of the present disclosure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

Figure 2:
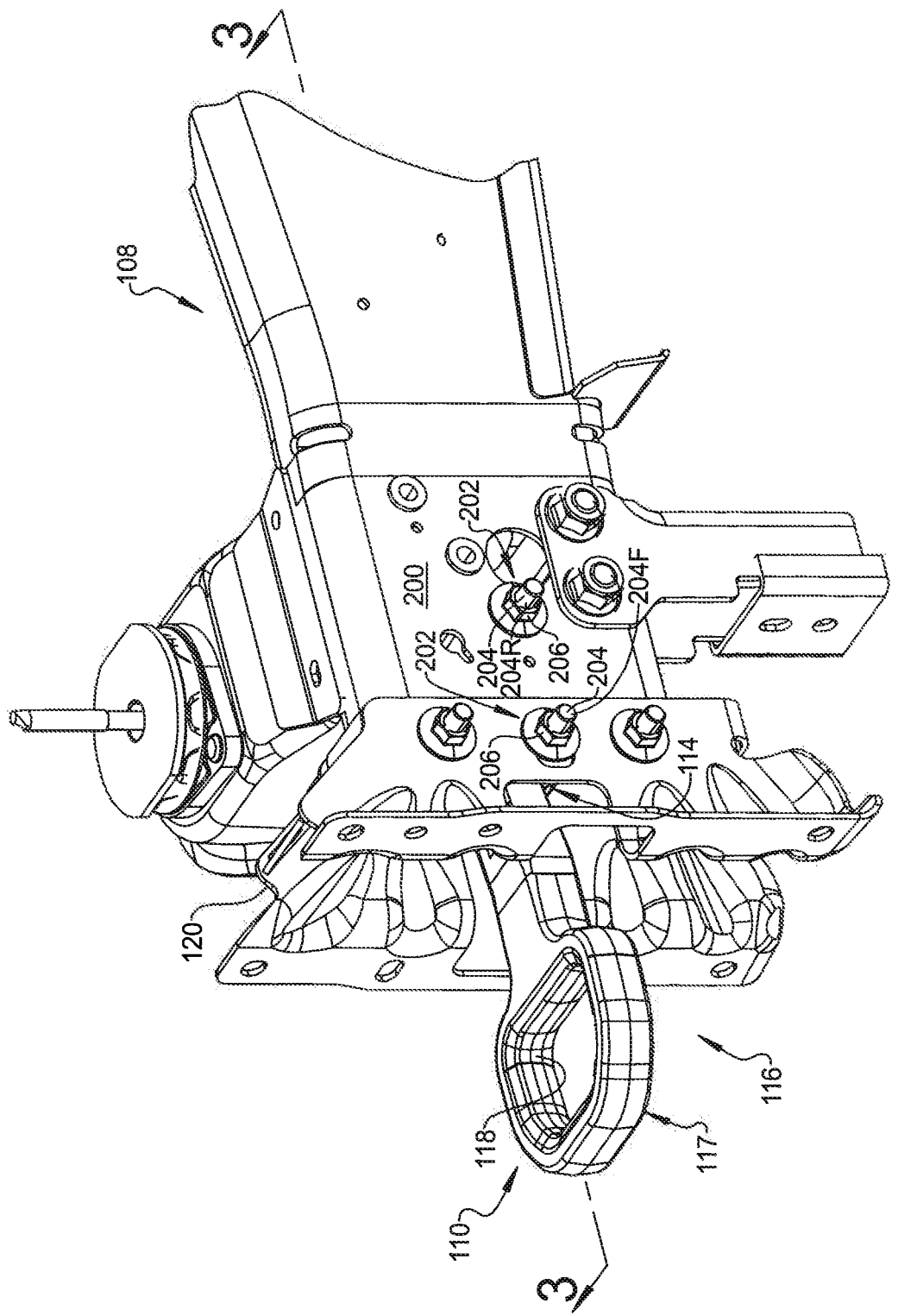
FIG. 2 is a perspective view of a front portion of the right side frame rail of FIG. 1 in circle 2 of FIG. 1.
Figure 3:
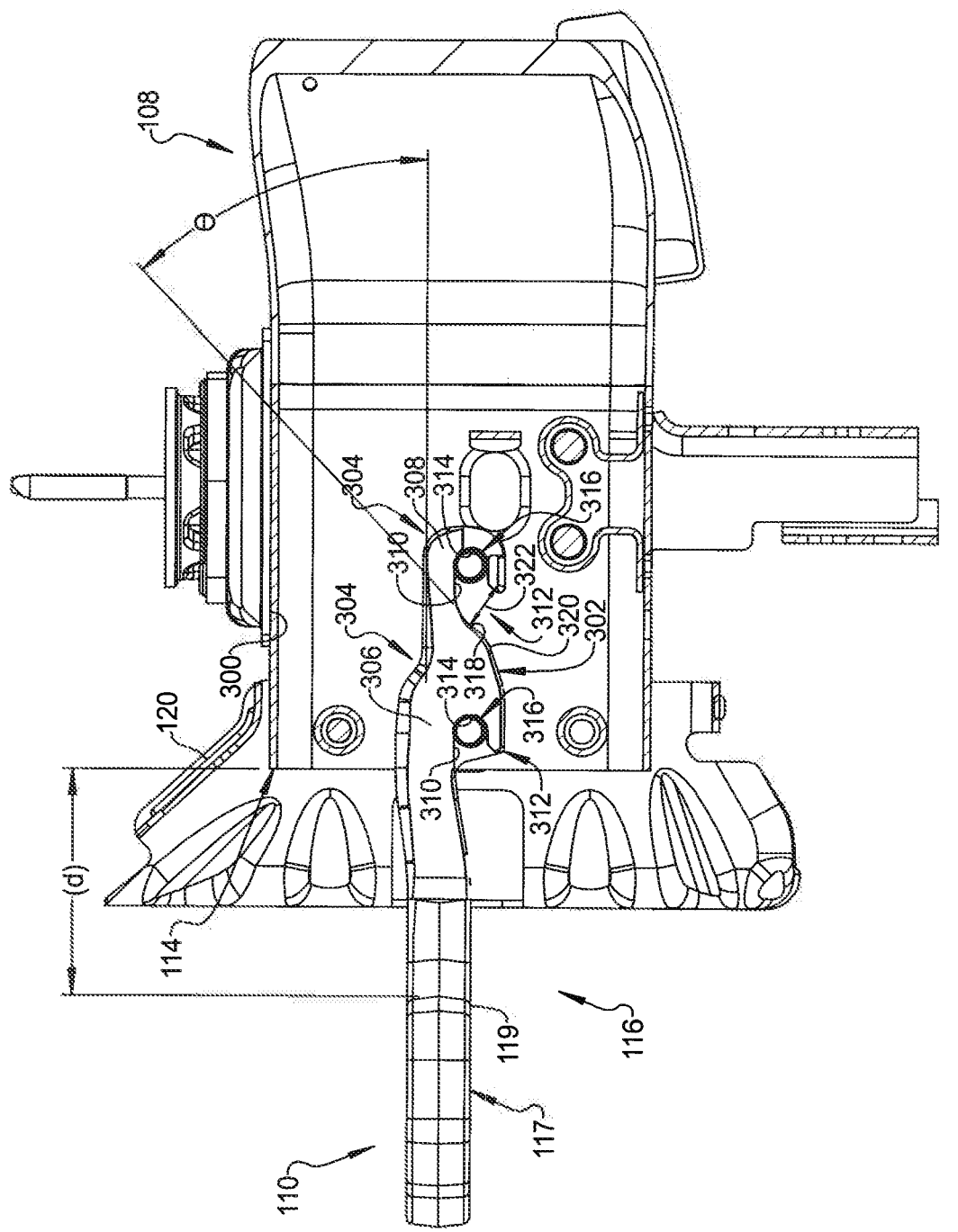
FIG. 3 is a section view taken along the line 3-3 of FIG. 2.

With reference to FIGS. 1-3, an automotive vehicle 100, shown representatively by dashed line 100, has a frame 102.

Frame 102 has a plurality of cross members 104, two of which are shown in FIG. 1, that extend laterally between a left side frame rail 106 and a right side frame rail 108. Left and right side frame rails 106, 108 extend longitudinally on left and right sides of vehicle 100, generally from a front of vehicle 100 to a rear of vehicle 100. It should be understood that front, rear, left and right are with reference to the front, rear, left and right of vehicle 100. It should also be understood that typically left side frame rail 106 and right side frame rail 108 have the same basic structural configuration except for differences due to one being a left side frame rail and the other being a right side frame rail. That is, in the context of the same basic structural configuration, the left and right side frame rails 106, 108 are mirror images of each other.

Tow hooks 110 are release mounted tow hooks as described herein. Tow hooks 110 are illustratively mounted to fronts 112, 114, respectively, of left and right side frame rails 106, 108. Tow hooks 110 each have a front portion 116 that extend forwardly from respective fronts 112, 114 of respective left and right side frame rails 106, 108. Each front portion 116 includes a front tip 117 (FIG. 2) having a tow opening 118 therein, such as a tow opening of the type described above in the Background section. A bumper assembly (not shown) is mounted to fronts 112, 114 of left and right side frame rails 106, 108 by bumper assembly attachment brackets 120 which are attached to the bumper assembly and to the fronts 112, 114 of left and right side frame rails 106, 108. Right and left side frame rails 106, 108 are channel rails such as described above. Left and right side frame rails 106, 108 illustratively have closed rectangular cross-sections having longitudinally extending channels therein, one of which is shown in FIG. 3 as channel 300 of right side frame rail 108. It should be understood that right and left side frame rails 106, 108 can be open channel rails and it should also be understood that they can have a cross-section other than rectangular.

Each tow hook 110 also has a rear portion 302 (FIG. 3). Rear portion 302 is received in channel 300 of the applicable left or right side frame rail 106, 108. The following description is with reference to right side frame rail 108 but it should be understood that it applies equally to left side frame rail 106. Rear portion 302 has at least one open slotted mounting member 304, illustratively two open slotted mounting members 304 longitudinally spaced from each other with a forward one of the open slotted mounting members 304 referred to herein as front open slotted mounting member 306 and a rearward one of the open slotted mounting members 304 referred to herein as rear open slotted mounting member 308. Rear open slotted mounting member 308 is spaced rearwardly from front open slotted mounting member 306. Each open slotted mounting member 304 has a slot 310 therein that extends rearwardly from an open front end 312 of the slot 310 to a rear wall 314 of open slotted mounting member 304 at a rear 316 of the slot 310.

Each open slotted mounting member 304 is secured to a wall 200 (FIG. 2) of right side frame rail 108 by a fastener 202 that extends through the slot 310 and tightened to that open slotted mounting member. In an aspect, the fastener 202 includes a bolt 204 and a nut 206. The bolt 204 extends through wall 200 of right side frame rail 108 and through slot 310 of that open slotted mounting member 304. Each nut 206 is tightened on the associated bolt 204 to secure rear portion 302 of tow hook 110 to right side frame rail 108. It should be understood that fastener types other than a nut and bolt could be used for fastener 202, such as a rivet where a post of the rivet extends through wall 200 and slot 310. It should be understood that the tow hook 110 mounted to left side frame rail 106 is mounted to left side frame rail 106 in the same way as the tow hook 110 mounted to right side frame rail 108 is mounted to right side frame rail 108. In this way, tow hooks 110 are releasably mounted to left and right side frame rails 106, 108, as further described below.

The operation of tow hook 110 is described with reference to right side frame rail 108, but it should be understood that the tow hook 110 mounted to left side frame rail 106 operates in the same way. When vehicle 100 is used to tow and item with tow hooks 110, a tow line (not shown) is secured to front portion 116 of tow hook 110, such as by being passed through tow opening 118 or a hook to which an end of the tow line is attached is hooked in tow opening 118. Vehicle 100 is operated in reverse. The tow line exerts a forward force vector on tow hook 110 which pulls rear wall 314 at the rear 316 of each open slotted mounting member 304 against the bolt 204. Illustratively, when tow hook 110 is mounted to right side frame rail 108, the tow hook 110 is pulled forwardly so that the rear wall 314 at the rear 316 of each open slotted mounting member 304 butts up against the associated bolt 204 and the associated nut 206 then tightened on that bolt 204.

When vehicle 100 experiences a frontal impact in which tow hook 110 is impacted, tow hook 110 is pushed rearwardly and at a relatively low impact force releases from bolts 204 and associated nuts 206. That is, open slotted mounting members 304 slide rearwardly due to the impact force and slide off bolts 204. In this regard, nuts 206 are tightened on bolts 204 at a torque that allows tow hook 110 to release from bolts 204 and nuts 206 at a relatively low impact force, such as the impact force exerted by a low speed collision of about 4 miles per hour. This prevents tow hook 110 from damaging frame 102, such as left and right side frame rails 106, 108. It also avoids affecting the impact management of the front end of vehicle 100 in the event of tow hook 110 frontal impact since tow hook 110 releases from the associated left side frame rail 106 or right side frame rail 108 at low impact force. As used herein, "low impact force" means force exerted by a low speed impact of 8 miles per hour or less.

In an aspect, slot 310 of front open slotted mounting member 306 extends horizontally backward from open front end 312 of slot 310 and slot 310 of rear open slotted mounting member 308 extends upwardly and backwardly from open front end 312 of slot 310 of rear open slotted mounting member 308 and then horizontally backward. In the following discussion, bolt 204 that extends through slot 310 of front open slotted mounting member 306 is referred to as front bolt 204F and the bolt 204 that extends through slot 310 of rear open slotted mounting member 308 is referred to as rear bolt 204R.

Rear open slotted mounting member 308 has an angled front wall 318 at open front end 312 of slot 310 of rear open slotted mounting member 308. Angled front wall 318 extends upwardly and backwardly from a lower back end 320 of front open slotted mounting member 306 at an angle Θ, which is an angle between horizontal and vertical (ninety degrees). In an aspect, angled front wall 318 is straight and in an aspect, angled front wall 318 is curved. Illustratively, Θ is illustratively optimized so that angled front wall 318 is as close to vertical as possible yet still allow rear open slotted mounting member 308 to be forced upwardly by the angled front wall 318 riding against rear bolt 204R in the event of an impact on tow hook 110, and also avoid the rear open slotted mounting member 308 from contacting a top of frame rail 108. In an example, Θ ranges between 30 and 60 degrees and is illustratively 45 degrees. A size an opening 322 at open front end 312 of slot 310 of rear open slotted mounting 308 is illustratively optimized by having it be small yet large enough to allow rear open slotted mounting member 308 to escape from rear bolt 204R in the event of impact on tow hook 110. By optimizing Θ and size of opening 322 in this manner, strength of rear open slotted member 308 is maximized while still allowing rear open slotted mounting member 308 to release from rear bolt 204R and move upwardly and backwardly in the event of impact on tow hook 110, as further explained below.

When the tow hook 110 releases backwards due to an impact, since slot 310 of front open slotted mounting member 306 is horizontal this slot 310 provides a direct or unobstructed path for front open slotted mounting member 306 to release from front bolt 204F. However, to allow tow hook 110 to have a greater stroke, as discussed below, rear open slotted mounting member 308 releases at an angle from rear bolt 204R, as discussed above.

As discussed above, both the angle θ and size of opening 322 at front end 312 of slot 310 of rear open slotted mounting member 308 are illustratively optimized to balance the ability of rear open slotted mounting member 308 to release from bolt 204 and overall strength of rear open slotted mounting member 308. As the size of opening 322 increases and θ decreases (angled front wall 318 becoming less vertical), the rear open slotted mounting member 308 has an easier ability to release from rear bolt 204R as the tow hook 110 moves rearward. While the tow hook 110 is secured and under a pulling load however, as the size of opening 322 increases and θ decreases, the stiffness provided by rear open slotted mounting member 308 to tow hook 110 at rear bolt 204R decreases. This reduced stiffness provided by rear open slotted mounting member 308 results in less stiffness at front tip 117 of tow hook 110 where tow hook 110 is being pulled. This can result in additional upward (or downward depending on direction of force being applied) movement of front tip 117 when tow hook 110 is being pulled. This additional movement by tip 117 can cause permanent deformation of the tow hook 110, or cause interaction damage to other components of vehicle 100, such as the bumper.

When the tow hook 110 releases backwards due to an impact, a stroke of the tow hook 110 is limited by a rear 119 (FIG. 3) of front tip 117 contacting front 114 (best shown in FIG. 3) of right side frame rail 108, creating a physical stack up. Stroke of the tow hook 110 as used herein is a distance that the tow hook 110 can be moved rearwardly by an impact before rear 119 of front tip 117 contact front 114 of right side frame rail 108. By maximizing a distance (d) (FIG. 3) between rear 119 of front tip 117 and front 114 of right side frame rail 108 when tow hook 110 is in its normal secured position, tow hook 110 is provided a maximum stroke distance. The normal secured position of tow hook 110 is when it is secured to one of frame rails 106, 108 and hasn't been moved rearwardly by an impact. It should be understood that in the above configuration, front 114 of right side frame rail 108 is also at a front 103 of frame 102.

It should be understood that structures, such as metal crush cans, foam materials or other energy absorbing components in the bumper, are able to use this distance (d) to deform and slow the vehicle down in a controlled manner during low speed impacts.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. If, for some reason, the imprecision provided by "about" is not otherwise understood in the art with this ordinary meaning, then "about" as used herein may indicate a possible variation of up to 5% of the indicated value or 5% variance from usual methods of measurement.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automotive vehicle, comprising:
    a frame having frame rails including a longitudinally extending left side frame rail and a longitudinally extending right side frame rail, wherein each frame rail has an interior channel;
    a tow hook releasably mounted to the left side frame rail and having a front portion extending forwardly from a front side of the left side frame rail and a rear portion received in the channel of the left side frame rail, and another tow hook releasably mounted to the right side frame rail and having a front portion extending forwardly from a front side of the right side frame rail and a rear portion received in the channel of the right side frame rail;
    the rear portion of each tow hook having at least one open slotted mounting member having a slot therein that extends rearwardly from an open front end of the slot; and
    each open slotted mounting member of the rear portion of each tow hook secured to an interior wall of the interior channel of the side frame rail to which it is mounted by a fastener that extends through the slot and tightened to that open slotted mounting member at a torque that allows the rear portion to release from the side frame rail to which it is mounted when the tow hook is impacted at a low impact force.

2. The automotive vehicle of claim 1 wherein the rear portion of each tow hook has more than one said open slotted mounting member with one open slotted mounting member being a front open slotted mounting member and another open slotted mounting member being a rear open slotted mounting member, wherein the front and rear mounting members are longitudinally spaced from each other.

3. The automotive vehicle of claim 2 wherein the fastener includes a nut and a bolt with the bolt extending through the wall of the side frame rail and the slot and the nut tightened on the bolt.

4. The automotive vehicle of claim 3 wherein the rear open slotted mounting member has an angled front wall at a front of the slot of the rear open slotted mounting member wherein the angled front wall angles upwardly and backwardly from a lower rear of the front open slotted mounting member at an angle between horizontal and vertical.

5. The automotive vehicle of claim 4 wherein the angle at which the angled front wall angles upwardly and backwardly is forty-five degrees.

6. The automotive vehicle of claim 1 wherein the front portion of each tow hook has a tow opening.

7. A tow hook for an automotive vehicle, the automotive vehicle having a frame that has right and left side frame rails; the tow hook comprising:
 a front portion and a rear portion, the rear portion receivable in a channel of one of the side frame rails with the front portion extending forwardly from a front of the side frame rail; and
 the rear portion having at least one open slotted mounting member having a slot therein that extends rearwardly from an open front end of the slot,
 wherein the rear portion has more than one said open slotted mounting member with one open slotted mounting member being a front mounting member and another open slotted mounting member being a rear mounting member, and
 wherein the front and rear mounting members are longitudinally spaced from each other.

8. The tow hook of claim 7 wherein the rear open slotted mounting member has an angled front wall at a front of the slot of the rear open slotted mounting member wherein the angled front wall angles upwardly and backwardly from a lower rear of the front open slotted mounting member at an angle between horizontal and vertical.

9. The tow hook of claim 8 wherein the angle at which the angled front wall angles upwardly and backwardly is forty-five degrees.

10. The tow hook of claim 7 wherein the front portion of the tow hook has a tow opening.

11. An automotive vehicle, comprising:
 a frame having frame rails including a longitudinally extending left side frame rail and a longitudinally extending right side frame rail, wherein each frame rail has an interior channel;
 a tow hook releasably mounted to the left side frame rail and having a front portion extending forwardly from a front side of the left side frame rail and a rear portion received in the channel of the left side frame rail, and another tow hook releasably mounted to the right side frame rail and having a front portion extending forwardly from a front side of the right side frame rail and a rear portion received in the channel of the right side frame rail;
 the rear portion of each tow hook has more than one open slotted mounting member, including a front open slotted mounting member and a rear open slotted mounting member;
 the front and rear open slotted mounting members are longitudinally spaced from each other, and each of the front and rear open slotted mounting members has a slot therein that extends rearwardly from an open front end of the slot; and
 each of the front and rear open slotted mounting members are secured to a wall of the side frame rail to which it is mounted by a fastener that extends through the slot and tightened to that open slotted mounting member at a torque that allows the rear portion to release from the side frame rail to which it is mounted when the tow hook is impacted at a low impact force.

12. The automotive vehicle of claim 11 wherein the fastener includes a nut and a bolt with the bolt extending through the wall of the side frame rail and the slot and the nut tightened on the bolt.

13. The automotive vehicle of claim 12 wherein the rear open slotted mounting member has an angled front wall at a front of the slot of the rear open slotted mounting member wherein the angled front wall angles upwardly and backwardly from a lower rear of the front open slotted mounting member at an angle between horizontal and vertical.

14. The automotive vehicle of claim 13 wherein the angle at which the angled front wall angles upwardly and backwardly is forty-five degrees.

15. The automotive vehicle of claim 11 wherein the front portion of each tow hook has a tow opening.

* * * * *